(12) United States Patent
Ko et al.

(10) Patent No.: US 11,637,904 B2
(45) Date of Patent: Apr. 25, 2023

(54) ELECTRONIC DEVICE FOR EFFECT-DRIVEN DYNAMIC MEDIA SELECTION FOR VISUAL IOT SERVICE USING REINFORCEMENT LEARNING AND OPERATING METHOD THEREOF

(71) Applicant: Korea Advanced Institute of Science and Technology, Daejeon (KR)

(72) Inventors: In-Young Ko, Daejeon (KR); Kyeongdeok Baek, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 7 days.

(21) Appl. No.: 17/157,470

(22) Filed: Jan. 25, 2021

(65) Prior Publication Data
US 2021/0352153 A1    Nov. 11, 2021

(30) Foreign Application Priority Data

May 8, 2020   (KR) .......................... 10-2020-0055062

(51) Int. Cl.
| | | |
|---|---|---|
| *H04L 67/51* | (2022.01) | |
| *G16Y 40/10* | (2020.01) | |
| *G06K 9/62* | (2022.01) | |
| *H04L 67/50* | (2022.01) | |

(52) U.S. Cl.
CPC ............ *H04L 67/51* (2022.05); *G06K 9/6262* (2013.01); *G16Y 40/10* (2020.01); *H04L 67/535* (2022.05)

(58) Field of Classification Search
CPC ......... H04L 67/16; H04L 67/22; H04L 67/51; H04L 67/535; G06K 9/6262; G16Y 40/10; G16Y 10/75; G16Y 40/20; G16Y 40/30; G16Y 40/03; G06F 3/011; G06F 3/14; G06N 20/00
See application file for complete search history.

(56) References Cited

U.S. PATENT DOCUMENTS

| | | | | |
|---|---|---|---|---|
| 11,047,693 | B1 * | 6/2021 | Schaefer | ................. G06F 3/016 |
| 2017/0310407 | A1 * | 10/2017 | Le Roux | ........... H04N 21/41422 |
| 2019/0064513 | A1 * | 2/2019 | Bagherpour | .......... G06F 3/0484 |
| 2021/0096802 | A1 * | 4/2021 | Faaborg | ..................... G06F 3/02 |

FOREIGN PATENT DOCUMENTS

| | | |
|---|---|---|
| KR | 10-2017-0078659 A | 7/2017 |
| KR | 10-2019-0104798 A | 9/2019 |

OTHER PUBLICATIONS

Baek et al., "Effect-driven Dynamic Selection of Physical Media for Visual IoT Services using Reinforcement Learning", IEEE International Conference on Web Services (ICWS), Jul. 9, 2019, 10 pages.

* cited by examiner

*Primary Examiner* — Kevin T Bates
*Assistant Examiner* — Ranjan Pant
(74) *Attorney, Agent, or Firm* — Leber IP Law; David C. Robertson

(57) ABSTRACT

An electronic device and an operating method thereof relate to effect-driven dynamic media selection for visual Internet of things (IoT) service using reinforcement learning, and may be configured to monitor a user in an Internet of things (IoT) service environment, predict a visual service effect of at least one service medium related to the user in the IoT service environment, select one of the at least one service medium based on the visual service effect, and provide service for the user through the selected service medium.

8 Claims, 11 Drawing Sheets

FIG. 6

| Algorithm 1 DQN Algorithm for Training EDMS-Agent |
|---|
| 1:   memory.initialize() |
| 2.   network$_Q$.initialize() |
| 3:   $\varepsilon = 1.0$ |
| 4:   for simulation = 1, $N_{simulation}$ do |
| 5:       env.reset() |
| 6:       for selection = 1, $N_{selection}$ do |
| 7:           o = env.observe() |
| 8:           if get_random_value() < $\varepsilon$ then |
| 9:               d = random_selection(o.D) |
| 10:          else |
| 11:               Q = network$_Q$.predict_Q(o.u, o.D) |
| 12:               d = argmax(Q) |
| 13:          end if |
| 14:          o', reward = env.selection(d) |
| 15:          memory.add(o, d, reward, o') |
| 16: |
| 17:          if memory.is_full() then |
| 18:             for m in memory do |
| 19:                 network$_Q$.update(m) |
| 20:             end for |
| 21:          end for |
| 22:       end for |
| 23:       $\varepsilon = \varepsilon * \varepsilon_{decay}$ |
| 24:   end for |

ELECTRONIC DEVICE FOR EFFECT-DRIVEN DYNAMIC MEDIA SELECTION FOR VISUAL IOT SERVICE USING REINFORCEMENT LEARNING AND OPERATING METHOD THEREOF

CROSS-REFERENCES TO RELATED APPLICATIONS

This application is based on and claims priority under 35 U.S.C. 119 to Korean Patent Application No. 10-2020-0055062, filed on May 8, 2020 in the Korean intellectual property office, the disclosures of which are herein incorporated by reference in their entireties.

TECHNICAL FIELD

Various embodiments relate to an electronic device for effect-driven dynamic media selection for visual IoT service using reinforcement learning and an operating method thereof.

BACKGROUND OF THE INVENTION

Recent advances in Internet of things (IoT) technologies have encouraged web services to expand their provision boundary to physical environments by utilizing IoT devices. In order to narrow a gap between the existing web environment and a physical IoT environment, a service-oriented computing scheme is checked again, and a new design concept and scheme for the IoT service are actively defined and developed. Automated service selection, that is, one of core tasks of service-oriented computing, is a choice process for selecting service most suitable for a user by evaluating quality of service (QoS) attributes of functionally equivalent candidate services and considering a situation, an environment condition, etc. of the user. However, in the existing technology, service for users is provided by considering only network-level QoS attributes. This is insufficient to provide service most suitable for users.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments provide an electronic device capable of providing service for a user by considering a physical effect for the user in an IoT service environment, and an operating method thereof.

Various embodiments provide an electronic device capable of generating a continuous physical effect for a user in an IoT service environment, and an operating method thereof.

Various embodiments provide an electronic device for effect-driven dynamic media selection for visual IoT service using reinforcement learning, and an operating method thereof.

In one aspect, an operating method of an electronic device may include monitoring a user in an Internet of things (IoT) service environment, predicting a visual service effect of at least one service medium related to the user in the IoT service environment, selecting one of the at least one service medium based on the visual service effect, and providing service for the user through the selected service medium.

In one aspect, an electronic device includes a memory and a processor connected to the memory and configured to execute at least one instruction stored in the memory. The processor may be configured to monitor a user in an Internet of things (IoT) service environment, predict a visual service effect of at least one service medium related to the user in the IoT service environment, select one of the at least one service medium based on the visual service effect, and provide service for the user through the selected service medium.

In one aspect, a computer program is stored in a non-transitory computer-readable recording service medium, and may be configured to execute monitoring a user in an Internet of things (IoT) service environment, predicting a visual service effect of at least one service medium related to the user in the IoT service environment, selecting one of the at least one service medium based on the visual service effect, and providing service for the user through the selected service medium.

According to various embodiments, the electronic device can monitor a user while continuously providing service for the user in an IoT service environment. Accordingly, the electronic device can dynamically select a service medium which may provide optimal service for the user in the IoT service environment. In dynamically selecting the service medium, the electronic device can minimize the number of handovers between media. Accordingly, a physical effect corresponding to the service for the user can be generated continuously effectively.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a diagram for describing operation characteristics of the electronic device according to various embodiments.

DETAILED DESCRIPTION

While illustrative embodiments have been illustrated and described, it will be appreciated that various changes can be made therein without departing from the spirit and scope of the invention.

Hereinafter, various embodiments of this document are described with reference to the accompanying drawings.

Figure 1:
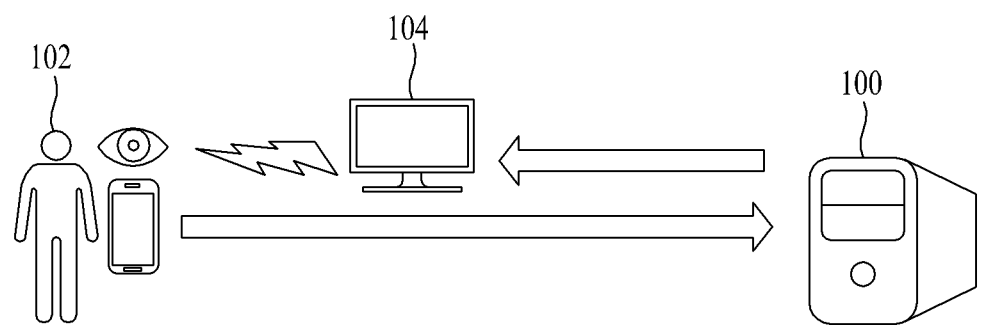
FIG. 1 is a diagram for describing IoT services related to various embodiments.

FIG. 1 is a diagram for describing the Internet of things (IoT) services related to various embodiments.

Referring to FIG. 1, an electronic device 100 according to various embodiments may provide IoT service for a user 102. For example, the electronic device 100 may include a server. The electronic device 100 may provide the IoT service through at least one service medium 104. Hereinafter, the service medium 104 may be a generic term for devices used to provide the IoT service. The service medium 104 may output information related to the IoT service. For example, the service medium 104 may include at least one of a display device or an audio playback device. Accordingly, the user 102 may detect the IoT service through a physical effect from the service medium 104. In this case, the physical effect may include at least one of a visual effect or an auditory effect. For example, the user 102 may recognize information related to the IoT service from the service medium 104 directly or through a portable device.

Figure 2:
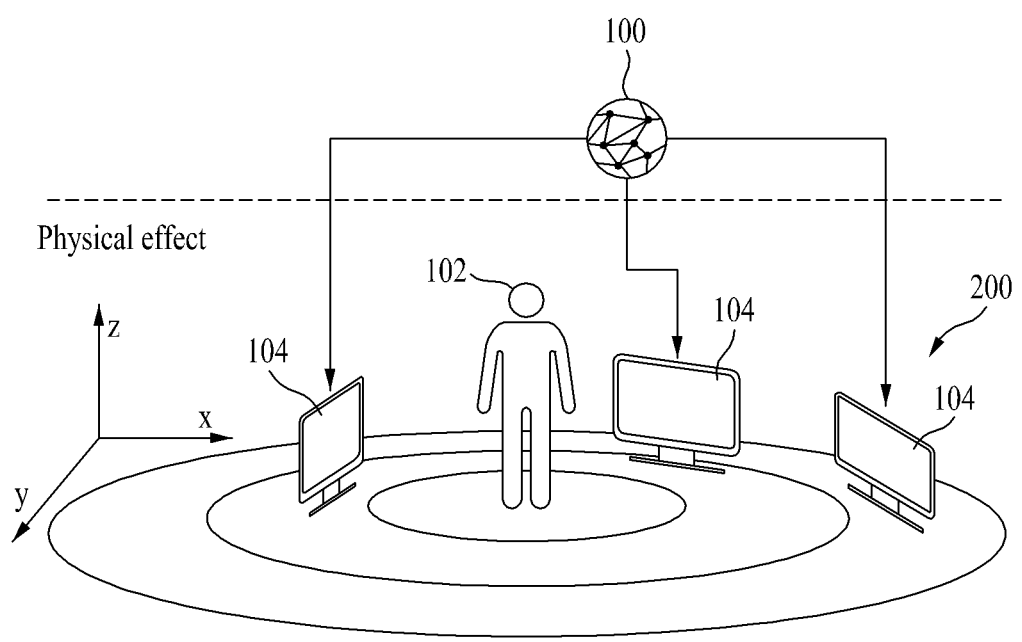
FIG. 2 is a diagram for describing an environment model for enabling an electronic device according to various embodiments to provide IoT service.

FIG. 2 is a diagram for describing an environment model 200 for enabling the electronic device 100 according to various embodiments to provide IoT service.

Referring to FIG. 2, the environment model 200 is defined over a time "t", and may be defined by an IoT service environment in which the user 102 and the at least one service medium 104 are disposed. For example, the environment model 200 may be defined like Equation 1. In this case, it may be assumed that there is no obstacle which may block a physical effect from the service medium 104 to the user 102. In the environment model 200, a location of the user 102 and a location of the service medium 104 are defined by coordinates of an x axis, a y axis and a z axis. The distance between the location of the user 102 and the location of the service medium 104 may be defined like Equation 2 based on the coordinates.

$$env(t) = \{u(t), s(t), \mathbb{D}\} \quad (1)$$

$$\text{distance}\left(\vec{l}_a, \vec{l}_b\right) = \left\|\vec{l}_a - \vec{l}_b\right\| \quad (2)$$

wherein env(t) may indicate the environment model 200, u(t) may indicate the user 102, $\mathbb{D}$ may indicate a set of the service medium 104, s(t) may indicate a visual IoT environment, $\vec{l}_a$ may indicate the location of the user 102, and $\vec{l}_b$ may indicate the location of the service medium 104.

Figure 3:
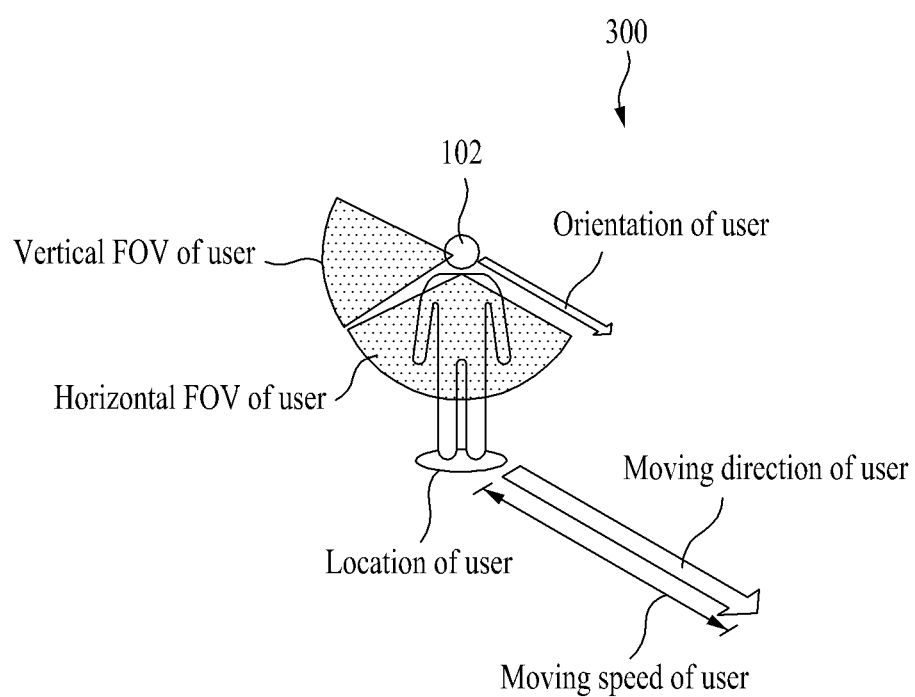
FIG. 3 is a diagram for describing a user model related to a user in the environment model of FIG. 2.

FIG. 3 is a diagram for describing a user model 300 related to the user 201 in the environment model 200 of FIG. 2.

Referring to FIG. 3, the user model 300 may indicate a condition and state of the user 102 which may affect the user 102 in recognizing information related to IoT service. In this case, the user model 300 is defined over a time "t", and may be defined based on at least one of a location of the user 102, an orientation of the user 102. or the mobility of eyes of the user 102. For example, the user model 300 may be defined like Equation 3 below. Furthermore, the mobility of eyes of the user 102 may be composed of a moving speed and orientation like Equation 4 below. A vertical field of view (FoV(vertical)) and a horizontal field of view (FoV(horizontal)) of the user 102 may be defined based on the moving speed and orientation.

$$u(t) = \left\{\vec{l}_u(t), \vec{o}_u(t), m_u(t)\right\} \quad (3)$$

$$m_u(t) = \{speed_u(t), dir_u(t)\} \quad (4)$$

wherein u(t) may indicate the user model 300, $\vec{l}_u(t)$ may indicate the location of the user 102, $\vec{o}_u(t)$ may indicate the orientation of the user 102, $m_u(t)$ may indicate the mobility of eyes of the user 102, $speed_u(t)$ may indicate the moving speed of the user 102, and $dir_u(t)$ may indicate the moving orientation of the user 102.

Figure 4:
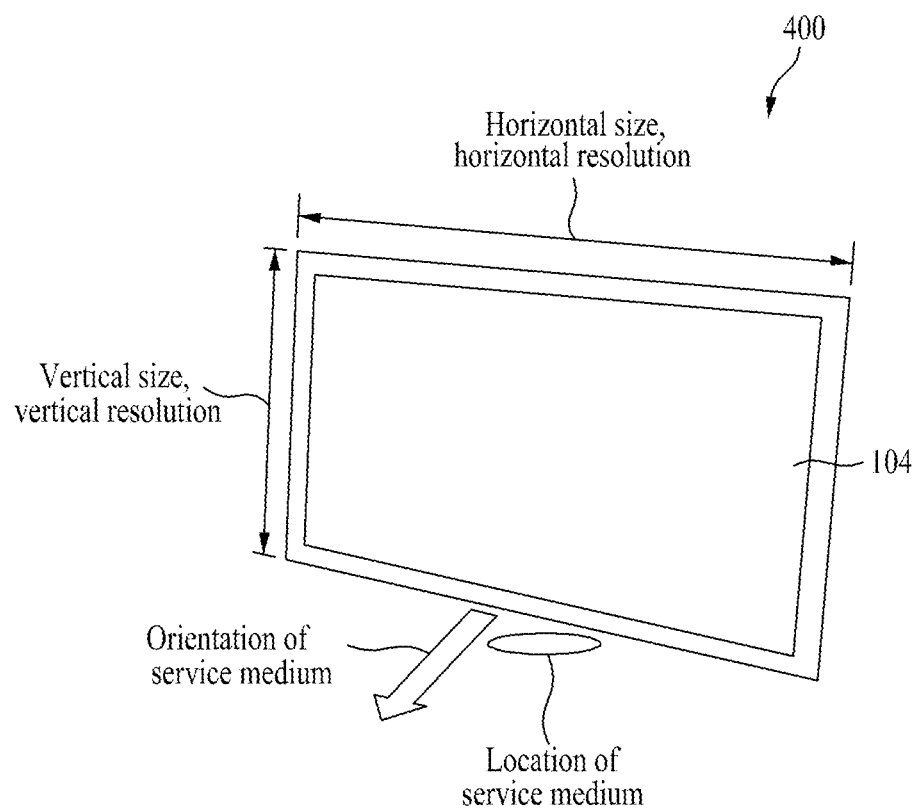
FIG. 4 is a diagram for describing an IoT service model related to an IoT service environment in the environment model of FIG. 2.

FIG. 4 is a diagram for describing an IoT service model 400 related to the IoT service environment in the environment model 200 of FIG. 2.

Referring to FIG. 4, the IoT service model 400 may indicate an operation of providing visual content using the at least one service medium 104. In this case, the IoT service model 400 is defined over time "t", and may be defined based on at least one of visual content or the service medium 104 selected over time "t." For example, the IoT service model 400 may be defined like Equation 5 below. The service medium 104 is a physical device for outputting the visual content, and may be defined by at least one of the size of the service medium 104, resolution of the service medium 104, a location of the service medium 104 or an orientation of the service medium 104. For example, the service medium 104 may be defined like Equation 6 below.

$$s(t) = \{c_s, d_s(t)\} \quad (5)$$

$$d = \left\{size_d, res_d, \vec{l}_d, \vec{o}_d\right\} \quad (6)$$

wherein s(t) may indicate the IoT service model 400, $c_s$ may indicate the visual content, $d_s(t)$ may indicate the service medium 104 selected to output the visual content, d may indicate the service medium 104, $size_d$ may indicate vertical and horizontal sizes of the service medium 104, $res_d$ may indicate vertical and horizontal resolution of the service medium 104, $\vec{l}_d$ may indicate a location of the service medium 104, and $\vec{o}_d$ may indicate an orientation of the service medium 104.

Figure 5:
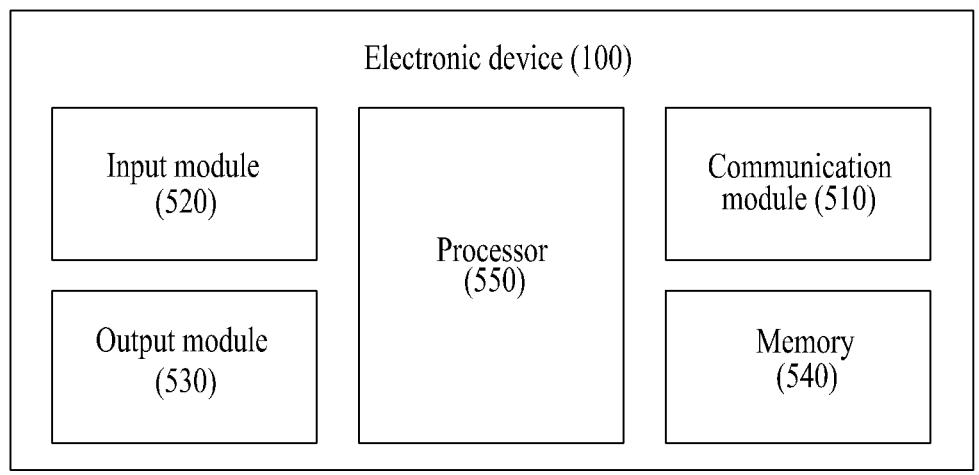
FIG. 5 is a diagram illustrating the electronic device according to various embodiments.

FIG. 5 is a diagram illustrating the electronic device 100 according to various embodiments. FIG. 6 is a diagram for describing operation characteristics of the electronic device 100 according to various embodiments.

Referring to FIG. 5, the electronic device 100 according to various embodiments may include at least one of a communication module 510, an input module 520, an output module 530, a memory 540 or a processor 550. In an embodiment, at least one of the components of the electronic device 100 may be omitted, and at least one element may be added to the components of the electronic device 100. In an embodiment, at least two of the components of the electronic device 100 may be implemented as a single integrated circuit.

The communication module 510 of the electronic device 100 may perform communication with an external device. The communication module 510 may establish a communication channel between the electronic device 100 and the external device, and may perform communication with the external device through the communication channel. In this case, the external device may include at least one of the service medium 104, a satellite, a base station, a server or another electronic device. The communication module 510 may include at least one of a wired communication module or a wireless communication module. The wired communication module is connected to the external device in a wired way through a connection terminal, and may communicate with the external device in a wired way. The wireless communication module may include at least one of a short-distance communication module or a long-distance communication module. The short-distance communication module may communicate with the external device using the short-distance communication method. For example, the short-distance communication method may include at least one of Bluetooth, WiFi direct, or infrared data association (IrDA). The long-distance communication module may communicate with the external device using the long-distance communication method. In this case, the long-distance communication module may communicate with the external device over a network. For example, the network may include at least one of a cellular network, the Internet, or a computer network, such as a local area network (LAN) or a wide area network (WAN).

The input module 520 may receive a signal to be used for at least one component of the electronic device 100. The input module 520 may receive, from the user, an instruction or data to be used for the processor 550, and may generate a signal. In this case, the input module 520 may collect an audio signal. For example, the input module 520 may include at least one of a microphone, a mouse or a keyboard. In an embodiment, the input module 520 may include at least one of touch circuitry configured to detect a touch or a sensor circuit configured to measure the intensity of a force generated by a touch.

The output module 530 may output information of the electronic device 100. The output module 530 may include at least one of a display module configured to visually output information or an audio output module capable of outputting information in the form of an audio signal. For example, the display module may include at least one of a display, a hologram device or a projector. For example, the display module may be assembled with at least one of the touch circuit or sensor circuit of the input module 520, and thus may be implemented as a touch screen. For example, the audio output module may include at least one of a speaker or a receiver.

The memory 540 may store various data used by at least one component of the electronic device 100. For example, the memory 540 may include at least one of a volatile memory or a nonvolatile memory. The data may include input data or output data related to at least one program. The program may be stored in the memory 540 as software including at least one instruction, and may include at least one of an operating system, middleware, or an application.

The processor 550 may control at least one component of the electronic device 100 by executing a program of the memory 540. Accordingly, the processor 550 may perform data processing or an operation. In this case, the processor 550 may execute an instruction stored in the memory 540.

The processor 550 may monitor the user in the IoT service environment. In this case, the processor 550 may monitor the user 102 while providing the service for the user 102 through a previously selected service medium 104. At least one service medium is disposed in the IoT service environment, and the user may move in the IoT service environment. The processor 550 may predict a visual service effect of the at least one service medium, which is related to the user in the IoT service environment. At this time, the processor 550 may compute a visual service effect of each service medium based on at least one of a distance between a location of the user and the location of the service medium, whether a visible area of the user is included in the location of the service medium, or an angle between an orientation of the user and an orientation of the service medium. The processor 550 may select a service medium based on the visual service effect. At this time, the processor 550 may predict the effectiveness of the service medium based on the visual service effect through reinforcement learning (RL). Furthermore, the processor 550 may select the service medium based on the effectiveness. In this case, the processor 550 may select the service medium corresponding to a maximum effectiveness. The processor 550 may provide service for the user through the service medium. At this time, the processor 550 may update an RL algorithm while providing the service for the user through the service medium. In this case, if the selected service medium is different from a previously selected service medium, the processor 550 may perform handover from the previously selected service medium to the selected service medium.

According to one embodiment, the RL algorithm may be an effect-driven dynamic media selection (EDMS) algorithm. To this end, the processor 550 may include an EDMS-agent substantially operating based on the EDMS algorithm. The effectiveness may indicate a cumulative value of the visual service effect of the service medium over time. For example, the effectiveness may be denoted as a Q-value. The Q-value may indicate a cumulative value of a reward according to media selection. The reward may occur in the IoT service environment in response to the service medium selection. In this case, the EDMS-agent may be implemented based on a training algorithm, such as that illustrated in FIG. 6.

Figure 7:
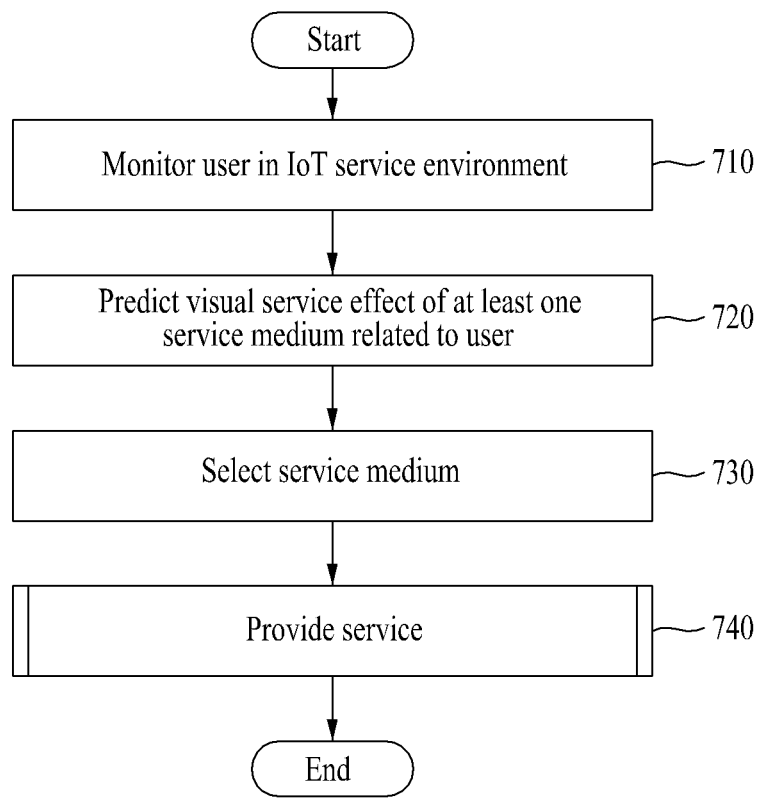
FIG. 7 is a diagram illustrating an operating method of the electronic device according to various embodiments.
Figure 8:
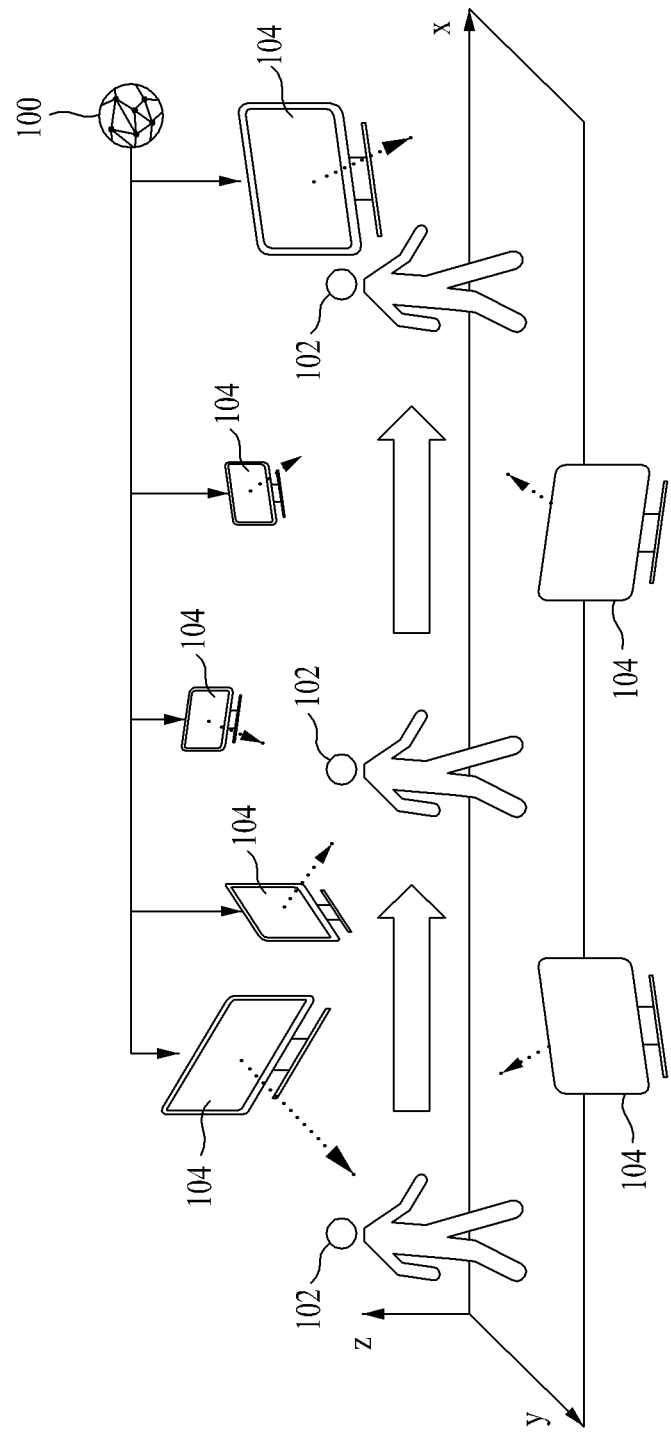
FIG. 8 is a diagram for describing an operation of monitoring a user in FIG. 7.
Figure 9:
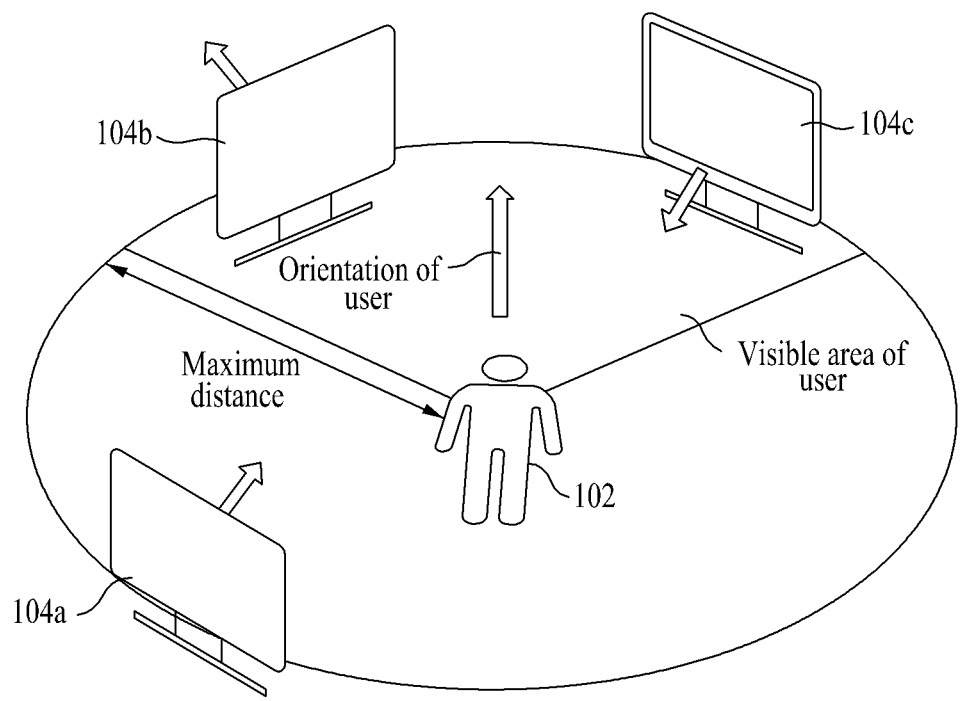
FIG. 9 is a diagram for illustratively describing an operation of predicting a visual service effect in FIG. 7.
Figure 10:
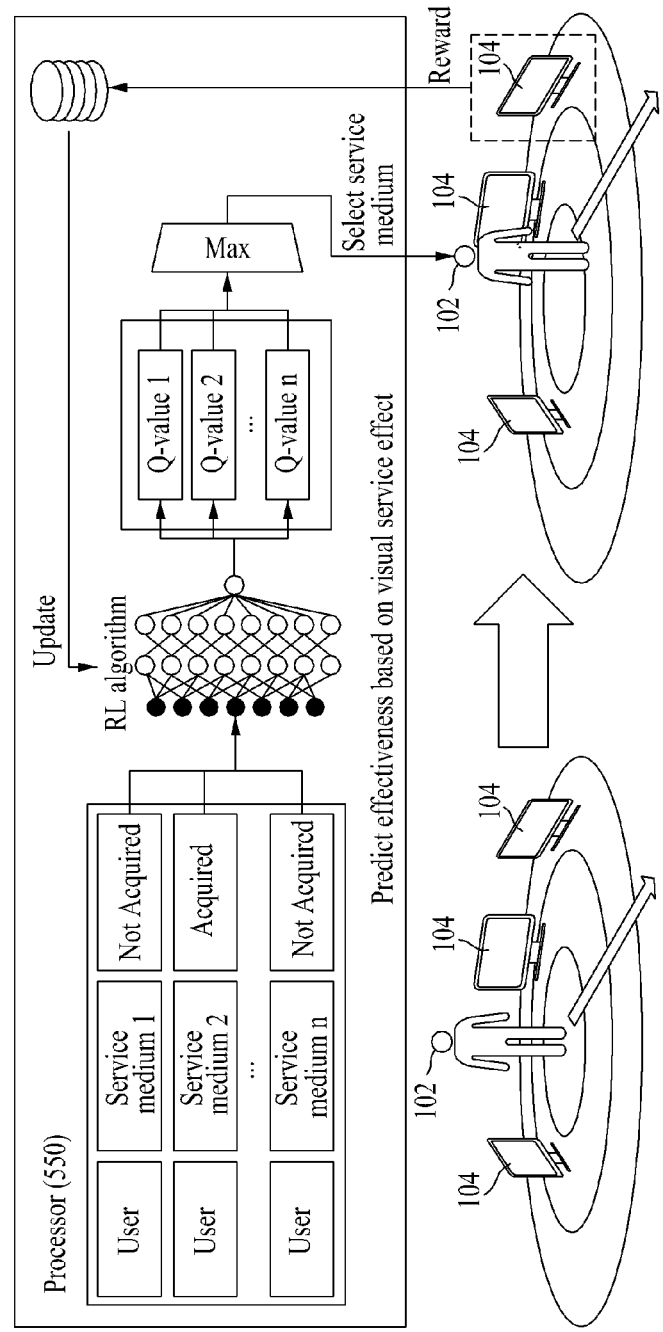
FIG. 10 is a diagram for illustratively describing an operation of selecting a service medium in FIG. 7.

FIG. 7 is a diagram illustrating an operating method of the electronic device 100 according to various embodiments. FIG. 8 is a diagram for describing an operation of monitoring the user 102 in FIG. 7. FIG. 9 is a diagram for illustratively describing an operation of predicting a visual service effect in FIG. 7. FIG. 10 is a diagram for illustratively describing an operation of selecting a service medium in FIG. 7.

Referring to FIG. 7, at operation 710, the electronic device 100 may monitor the user 102 in an IoT service environment. At least one service medium 104 is disposed in the IoT service environment. The IoT service environment may be implemented based on the IoT service model 400 according to each service medium 104. Furthermore, the user 102 may be present within the IoT service environment. The user model 300 may be implemented with respect to the user 102. In this case, the user 102 may move in the IoT service environment, as illustrated in FIG. 8. At this time, the processor 550 may monitor the user 102 while providing service for the user 102 through a previously selected service medium 104. The processor 550 may monitor the user over time "t" in the IoT service environment. Accordingly, the processor 550 may define the environment model 200 for the user 102 over time "t." In this case, factors of the environment model 200 may be checked as in Table 1 below.

TABLE 1

| | Variability | Factor |
|---|---|---|
| User 102 | Variable | Location of user 102 |
| | Variable | Orientation of user 102 |
| | Constant | Field of view of user 102 |
| IoT service environment | Constant | Vertical size of service medium 104 |
| | Constant | Horizontal size of service medium 104 |
| | Constant | Vertical resolution of service medium 104 |
| | Constant | Horizontal resolution of service medium 104 |
| | Constant | Location of service medium 104 |
| | Constant | Orientation of service medium 104 |
| | Constant | Minimum text size of content |

At operation 720, the electronic device 100 may predict a visual service effect of the at least one service medium 104, which is related to the user 102 in the IoT service environment. For example, the at least one service medium 104 may be present around the user 102. Such a service medium 104 may be referred to as a candidate service medium. The processor 550 may compute a visual service effect of each service medium 104 based on at least one of a distance between a location of the user 102 and a location of the service medium 104, whether a visible area of the user 102 is included in the location of the service medium 104, or an angle between an orientation of the user 102 and an orientation of the service medium 104. In this case, the range of the visual service effect is [0, 1], wherein 1 may indicate a maximum visual service effect, and 0 may indicate that there is no visual service effect. For example, the processor 550 may compute the visual service effect based on a rule, such as Equation 7 below. For example, when the distance between the location of the user 102 and the location of the service medium 104 is a preset distance or more, the visual service effect may be 0. When the distance between the location of the user 102 and the location of the service medium 104 is not the preset distance or more, the visual service effect may be 1. For example, when the location of the service medium 104 is not included in the visible area of the user 102, the visual service effect may be 0. When the location of the service medium 104 is included in the visible area of the user 102, the visual service effect may be 1. For another example, when the angle between the orientation of the user 102 and the orientation of the service medium 104 is less than 90°, the visual service effect may be 0. When the angle between the orientation of the user 102 and the orientation of the service medium 104 is not less than 90°, the visual service effect may be 1.

$$e(u(t), d) = \begin{cases} 0 & \|\vec{l}_u(t) - \vec{l}_d\| \geq distance_{max}(d) \\ 0 & \vec{l}_d \notin \mathbb{V}(u(t)) \\ 0 & angle(\vec{o}_u(t), \vec{o}_d) < 90° \\ 1 & otherwise \end{cases} \quad (7)$$

wherein e(u(t),d) may indicate the visual service effect, $\vec{l}_u(t)$ may indicate the location of the user 102, $\vec{l}_d$ may indicate the location of the service medium 104, distance$_{max}$(d) may indicate a distance preset in accordance with the service medium 104, $\mathbb{V}$(u(t)) may indicate the visible area of the user 102, $\vec{o}_u(t)$ may indicate the orientation of the user 102, and $\vec{o}_d$ may indicate the orientation of the service medium 104. The rule, such as Equation 7, may be defined as follows.

In relation to a visual angle of content, when a distance between a location of the user 102 and a location of the service medium 104 is a preset distance or more, a rule in which a visual service effect is 0 may be detected. For example, a person who has a standard vision of 6/6 may separate contours within a visual angle of 1 arcmin. The visual angle may be calculated as in Equation 8 below. If a unit size of content provided by IoT visual service is known, a maximum distance at which the user 102 may recognize content output by the service medium 104 may be calculated as in Equation 9 below. If a minimum text size of the content is specified in units of pixel, an actual size of text output by the service medium 104 may be calculated as in Equation 10 below based on the size and resolution of the service medium 104. A rule in which when the distance between the location of the user 102 and the location of the service medium 104 is longer than the maximum distance based on the actual size, the visual service effect is 0 may be extracted because the perceived size of the text is reduced and thus the user 102 cannot correctly recognize the text.

$$visual\_angle(u, d) = 2 * \arctan\left(\frac{size_{text}}{2 * \|\vec{l}_u(t) - \vec{l}_d\|}\right) \quad (8)$$

$$distance_{max}(d) = \frac{size_{text}(d)}{2 * \tan\left(\frac{visual\_angle_{min}}{2}\right)} \quad (9)$$

$$size_{text}(d) = \min\left(\frac{size_{d,v}}{res_{d,v}}, \frac{size_{d,h}}{res_{d,h}}\right) \times size_{c,min} \quad (10)$$

wherein visual_angle$_{min}$ may indicate visual angle, size$_{text}$(d) may indicate the text size of the content, distance$_{max}$(d) may indicate the maximum distance, and size$_{c,min}$ may indicate the minimum text size of the content.

In relation to the visible area of the user 102, a rule in which when the location of the service medium 104 is not included in the visible area of the user 102, the visual service effect is 0 may be detected. For example, it may be assumed that when the user 102 recognizes that desired visual content is output by the service medium 104, the user may turn his or her face toward the service medium 104. Accordingly, all the media 104 within the visible area of the user 102 may be considered to be effective media 104 which may deliver visual content for the user 102. The visible area of the user 102 may be determined based on a visual angle of the user 102, and may be determined based on a location and orientation of eyes of the user 102. The visible area of the user 102 over time "t" may be calculated as in Equation 11 below based on an internal product of a vector indicative of a relative location between the user 102 and the service medium 104 and the orientation of the user 102. A rule in which when the location of the service medium 104 is not included in the visible area of the user 102 based on the calculated visible area, the visual service effect is 0 may be extracted because the user 102 cannot perceive light generated by the service medium 104 outside the visible area of the user.

$$\mathbb{V}(u(t)) = \left\{\vec{l} \mid \arccos\left(\frac{\vec{o}_u(t) \cdot (\vec{l} - \vec{l}_u(t))}{\|\vec{o}_u(t)\|\|\vec{l} - \vec{l}_u(t)\|}\right) \leq FoV\right\} \quad (11)$$

In relation to the orientation of the user 102 and the orientation of the service medium 104, a rule in which when an angle between an orientation of the user 102 and an orientation of the service medium 104 is less than 90°, the visual service effect is 0 may be detected. For example, since light moves in a straight line, visual content of the service medium 104 can be successfully delivered to the user 102 only when the user 102 and the service medium 104 face each other. At this time, an angle between an orientation of the user 102 and an orientation of the service medium 104 may be calculated like Equation 12 below. A rule in which when the user 102 and the service medium 104 do not face each other, the visual service effect is 0 may be extracted.

$$\text{angle}(\vec{\partial}_u(t), \vec{\partial}_d) = \arccos\left(\frac{\vec{\partial}_u(t) \cdot \vec{\partial}_d}{\|\vec{\partial}_u(t)\| \|\vec{\partial}_d\|}\right) \quad (12)$$

For example, as illustrated in FIG. 9, a first service medium 104a, a second service medium 104b, and a third service medium 104c may be disposed around the user 102. In such a case, a visual service effect of the first service medium 104a may be 0 because a location of the first service medium 104a is disposed outside a visible area of the user 102. A visual service effect of the second service medium 104b may be 0 because an orientation of the second service medium 104b is not directed toward the user 102. A visual service effect of the third service medium 104c may be 1 because a location of the third service medium 104c is disposed within the visible area of the user 102 and an orientation of the third service medium 104c is directed toward the user 102.

At operation 730, the electronic device 100 may select a service medium 104 based on the visual service effect. At this time, the processor 550 may predict the effectiveness of the service medium 104 based on the visual service effect through reinforcement learning (RL). In this case, as illustrated in FIG. 10, the processor 550 may predict the effectiveness of the service medium 104 based on the visual service effect using an RL algorithm. In this case, the RL algorithm may be an effect-driven dynamic media selection (EDMS) algorithm. To this end, the processor 550 may include an EDMS-agent substantially operating based on the EDMS algorithm. The effectiveness may indicate a cumulative value of the visual service effect of the service medium 104 over time. For example, the effectiveness may also be denoted as a Q-value. The Q-value may indicate a cumulative value of a reward based on the selection of the service medium 104. The reward may occur in an IoT service environment in response to the selection of the service medium 104. Furthermore, the processor 550 may select the service medium 104 based on the effectiveness. For example, the processor 550 may select one of candidate media 104. The processor 550 may select a service medium 104 corresponding to a maximum effectiveness.

At operation 740, the electronic device 100 may provide service for the user 102 through the service medium 104. The processor 550 may update the RL algorithm while providing the service for the user 102 through the service medium 104. In this case, as illustrated in FIG. 10, the processor 550 may update at least one parameter of the RL algorithm based on a reward from the IoT service environment. According to one embodiment, the electronic device 100 may perform handover between a plurality of the service medium 104 by a minimum number. This will be described later more specifically with reference to FIG. 11.

Figure 11:
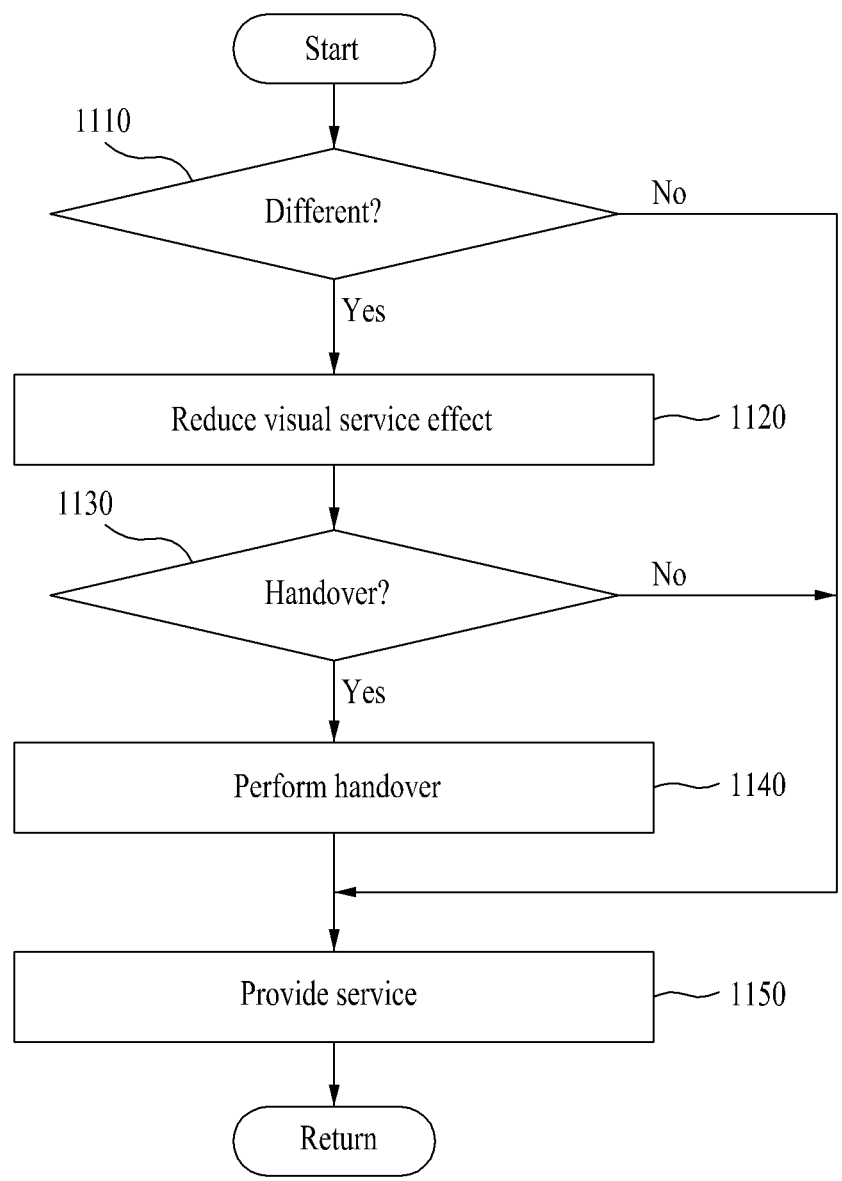
FIG. 11 is a diagram illustrating an example of an operation of providing service in FIG. 7.

FIG. 11 is a diagram illustrating an example of an operation of providing service in FIG. 7.

Referring to FIG. 11, at operation 1100, the electronic device 100 may determine whether it is necessary to perform handover from a previously selected service medium 104 to a selected service medium 104. That is, the processor 550 may determine whether the selected service medium 104 is different from the previously selected service medium 104. For example, the processor 550 may compare an identifier of the selected service medium 104 and an identifier of the previously selected service medium 104.

When the selected service medium 104 is different from the previously selected service medium 104 at operation 1100, at operation 1120, the electronic device 100 may reduce a visual service effect of the selected service medium 104. In this case, the processor 550 may reduce the visual service effect of the selected service medium 104 by 1 as in Equation 13 below. Thereafter, at operation 1130, the electronic device 100 may determine whether to perform handover to the selected service medium 104 based on the reduced visual service effect. That is, the processor 550 may determine whether the visual service effect of the selected service medium 104 is a maximum visual service effect.

$$r(t) = \begin{cases} e(u(t), d_s(t)) & d_s(t-1) = d_s(t) \\ e(u(t), d_s(t)) - 1 & d_s(t-1) \neq d_s(t) \end{cases} \quad (13)$$

If it is determined that the handover may be performed at operation 1130, at operation 1140, the electronic device 100 may perform the handover from the previously selected service medium 104 to the selected service medium 104. That is, if it is determined that the visual service effect of the selected service medium 104 is still a maximum visual service effect at operation 1130, the processor 550 may perform handover from the previously selected service medium 104 to the selected service medium 104. Accordingly, at operation 1150, the electronic device 100 may provide service for the user 102 through the selected service medium 104.

If it is determined that the handover should not be performed at operation 1130, the electronic device 100 may not perform handover from the previously selected service medium 104 to the selected service medium 104. That is, if it is determined that the visual service effect of the selected service medium 104 is not a maximum visual service effect at operation 1130, the processor 550 may not perform handover from the previously selected service medium 104 to the selected service medium 104. Accordingly, at operation 1150, the electronic device 100 may continuously provide service for the user 102 through the previously selected service medium 104.

When the selected service medium 104 is identical with the previously selected service medium 104 at operation 1110, the electronic device 100 may maintain a visual service effect of the selected service medium 104. At this time, the processor 550 may maintain the visual service effect of the selected service medium 104 as in Equation 13. Thereafter, at operation 1150, the electronic device 100 may continuously provide the service for the user 102 through the previously selected service medium 104.

According to various embodiments, the electronic device 100 may continue to monitor the user 102 while providing service for the user 102 in the IoT service environment. Accordingly, the electronic device 100 can dynamically select the service medium 104 capable of providing an optimal service for the user 102 in the IoT service environment. In this case, the electronic device 100 can minimize the number of times of handover between the service medium 104 in dynamically selecting the service medium 104. Accordingly, a physical effect corresponding to the service for the user 102 can be continuously effectively generated.

An operating method of the electronic device 100 according to various embodiments may include monitoring the user 102 in the IoT service environment, predicting a visual service effect of at least one service medium 104 related to the user 102 in the IoT service environment, selecting one of the at least one service medium 104 based on the visual service effect, and providing service for the user 102 through the selected service medium 104.

According to various embodiments, the predicting of the visual service effect may include predicting the visual service effect of the at least one service medium 104 based on at least one of a distance between a location of the user 102 and a location of each service medium 104, whether a visible area of the user 102 is included in the location of each service medium 104, or an angle between an orientation of the user 102 and an orientation of each service medium 104.

According to various embodiments, the selecting of one of the at least one service medium 104 may include predicting effectiveness of the at least one service medium 104 based on the visual service effect using a predetermined RL algorithm and selecting one of the at least one service medium 104 based on the effectiveness.

According to various embodiments, the predicting of the effectiveness may include predicting the effectiveness based on a cumulative value of the visual service effect of the at least one service medium 104 over time.

According to various embodiments, the operating method of the electronic device 100 may further include updating at least one parameter of the RL algorithm based on a reward from the IoT service environment, while providing the service for the user 102 through the selected service medium 104.

According to various embodiments, the monitoring of the user may include monitoring the user 102 while providing the service for the user 102 through a previously selected service medium 104.

According to various embodiments, the operating method of the electronic device 100 may further include comparing an identifier of the selected service medium 104 and an identifier of the previously selected service medium 104 and performing handover from the previously selected service medium 104 to the selected service medium 104 based on a result of the comparison.

According to various embodiments, the performing of the handover may include reducing the predicted visual service effect of the selected service medium 104 when the selected service medium 104 is different from the previously selected service medium 104, determining whether to perform handover to the selected service medium 104 based on the reduced visual service effect of the selected service medium 104, and performing the handover if it is determined that the handover to the selected service medium 104 has to be performed.

According to various embodiments, the operating method of the electronic device 100 may further include providing the service for the user 102 through the previously selected service medium 104 if it is determined that the handover to the selected service medium 104 does not need to be performed.

The electronic device 100 according to various embodiments may include the memory 540, and the processor 550 connected to the memory 540 and configured to execute at least one instruction stored in the memory 540.

According to various embodiments, the processor 550 may be configured to monitor the user 102 in the IoT service environment, predict a visual service effect of at least one service medium 104 related to the user 102 in the IoT service environment, select one of the at least one service medium 104 based on the visual service effect, and provide service for the user 102 through the selected service medium 104.

According to various embodiments, the processor 550 may be configured to predict the visual service effect of the at least one service medium 104 based on at least one of a distance between a location of the user 102 and a location of each service medium 104, whether a visible area of the user 102 is included in the location of each service medium 104, or an angle between an orientation of the user 102 and an orientation of each service medium 104.

According to various embodiments, the processor 550 may be configured to predict effectiveness of the at least one service medium 104 based on the visual service effect using a predetermined RL algorithm and select one of the at least one service medium 104 based on the effectiveness.

According to various embodiments, the processor 550 may be configured to predict the effectiveness based on a cumulative value of the visual service effect of the at least one service medium 104 over time.

According to various embodiments, the processor 550 may be configured to update at least one parameter of the RL algorithm based on a reward from the IoT service environment, while providing the service for the user 102 through the selected service medium 104.

According to various embodiments, the processor 550 may be configured to monitor the user 102 while providing the service for the user 102 through a previously selected service medium 104.

According to various embodiments, the processor 550 may be configured to compare an identifier of the selected service medium 104 and an identifier of the previously selected service medium 104 and perform handover from the previously selected service medium 104 to the selected service medium 104 based on a result of the comparison.

According to various embodiments, the processor 550 may be configured to reduce the predicted visual service effect of the selected service medium 104 when the selected service medium 104 is different from the previously selected service medium 104, determine whether to perform handover to the selected service medium 104 based on the reduced visual service effect of the selected service medium 104, and perform the handover if it is determined that the handover to the selected service medium 104 has to be performed.

According to various embodiments, the processor 550 may be configured to provide the service for the user 102 through the previously selected service medium 104 if it is determined that the handover to the selected service medium 104 does not need to be performed.

Various embodiments of this document may be implemented as software (e.g., a program) including one or more instructions stored in a storage service medium (e.g., the memory 540) readable by a machine (e.g., the electronic device 100). For example, a processor (e.g., the processor 550) of the machine (e.g., the electronic device 100) may invoke at least one of the one or more instructions stored in the storage service medium, and may execute the instruction. This enables the machine to operate to perform at least one function based on the invoked at least one instruction. The one or more instructions may include a code generated by a complier or a code executable by an interpreter. The storage service medium readable by the machine may be provided in the form of a non-transitory storage service medium. In this case, the term "non-transitory" merely means that the storage service medium is a tangible device and does not include a signal (e.g., electromagnetic wave). The term does not distinguish between a case where data is semi-permanently stored in the storage service medium and a case where data is temporally stored in the storage service medium According to one embodiment, the method according to various embodiments disclosed in this document may be included in a computer program product and provided. The computer program product may be traded as a product between a seller and a purchaser. The computer program product may be distributed in the form of a device-readable recording service medium (e.g., a compact disc read only memory (CD-ROM)) or may be distributed through an application store (e.g., PlayStore™) or directly (e.g., downloaded or uploaded) between two user devices (e.g., smartphones) online. If the computer program product is distributed online, at least some of the computer program product may be at least temporarily stored or temporarily generated in a device-readable storage service medium, such as a memory included in the server of a manufacturer, the server of an application store, or a relay server.

A computer program according to various embodiments is stored in a non-transitory computer-readable recording service medium, and may execute an operation of monitoring the user 102 in the IoT service environment, an operation of predicting a visual service effect of at least one service medium 104 related to the user 102 in the IoT service environment, an operation of selecting one of the at least one service medium 104 based on the visual service effect, and an operation of providing service for the user 102 through the selected service medium 104.

According to various embodiments, the operation of predicting the visual service effect may include an operation of calculating the visual service effect of the at least one service medium 104 based on at least one of a distance between a location of the user 102 and a location of each service medium 104, whether a visible area of the user 102 is included in the location of each service medium 104, or an angle between an orientation of the user 102 and an orientation of each service medium 104.

According to various embodiments, the operation of selecting the service medium 104 may include an operation of predicting effectiveness of the at least one service medium 104 based on the visual service effect using a predetermined RL algorithm and an operation of selecting one of the at least one service medium 104 based on the effectiveness.

The embodiments of this document and the terms used in the embodiments are not intended to limit the technology described in this document to a specific embodiment, but should be construed as including various changes, equivalents and/or alternatives of a corresponding embodiment. In the description of the drawings, similar reference numerals may be used in similar components. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" and "the second", may modify corresponding components regardless of their sequence or importance, and are used to only distinguish one component from the other component and do not limit corresponding components. When it is described that one (e.g., first) component is "(functionally or communicatively) connected to" or "coupled with" the other (e.g., second) component, the one component may be directly connected to the other component or may be connected to the other component through another component (e.g., third component).

The "module" used in this document includes a unit composed of hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

According to various embodiments, each (e.g., module or program) of the described components may include a single entity or a plurality of entities. According to various embodiments, one or more of the aforementioned components or operations may be omitted or one or more other components or operations may be added. Alternatively or additionally, a plurality of components (e.g., modules or programs) may be integrated into one component. In such a case, the integrated components may perform one or more functions of each of a plurality of components identically with or similar to that performed by a corresponding one of the plurality of components before the components are integrated. According to various embodiments, other components performed by a module, an operation or another program may be executed sequentially, in parallel, repeatedly or heuristically, or one or more of the operations may be executed in different order or may be omitted, or one or more other operations may be added.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. An operating method of an electronic device, comprising:
    monitoring a user in an Internet of things (IoT) service environment;
    predicting a visual service effect of at least one service medium related to the user in the IoT service environment;
    selecting one of the at least one service medium based on the visual service effect; and
    providing service for the user through the selected service medium;
    wherein the predicting of the visual service effect comprises predicting the visual service effect of the at least one service medium based on at least one of a distance between a location of the user and a location of each service medium, whether a visible area of the user is included in the location of each service medium, or an angle between an orientation of the user and an orientation of each service medium; and wherein the selecting of one of the at least one service medium comprises:

predicting effectiveness of the at least one service medium based on the visual service effect using a predetermined reinforcement learning (RL) algorithm; and selecting one of the at least one service medium based on the effectiveness;

wherein the monitoring of the user comprises monitoring the user while providing the service for the user through a previously selected service medium, the operating method further comprising:

comparing an identifier of the selected service medium and an identifier of the previously selected service medium; and performing handover from the previously selected service medium to the selected service medium based on a result of the comparison, wherein the performing of the handover comprises:

reducing the predicted visual service effect of the selected service medium when the selected service medium is different from the previously selected service medium;

determining whether to perform handover to the selected service medium based on the reduced visual service effect of the selected service medium; and performing the handover if it is determined that the handover to the selected service medium has to be performed.

2. The operating method of claim 1, wherein the predicting of the effectiveness comprises predicting the effectiveness based on a cumulative value of the visual service effect of the at least one service medium over time.

3. The operating method of claim 1, further comprising updating at least one parameter of the RL algorithm based on a reward from the IoT service environment, while providing the service for the user through the selected service medium.

4. The operating method of claim 1, further comprising providing the service for the user through the previously selected service medium if it is determined that the handover to the selected service medium does not need to be performed.

5. An electronic device comprising:

a memory; and a processor connected to the memory and configured to execute at least one instruction stored in the memory, wherein the processor is configured to:

monitor a user in an Internet of things (IoT) service environment, predict a visual service effect of at least one service medium related to the user in the IoT service environment, select one of the at least one service medium based on the visual service effect, and provide service for the user through the selected service medium;

wherein the processor is configured to predict the visual service effect of the at least one service medium based on at least one of a distance between a location of the user and a location of each service medium, whether a visible area of the user is included in the location of each service medium, or an angle between an orientation of the user and an orientation of each service medium; and wherein the processor is configured to:

predict effectiveness of the at least one service medium based on the visual service effect using a predetermined reinforcement learning (RL) algorithm, and select one of the at least one service medium based on the effectiveness;

wherein the monitoring of the user comprises monitoring the user while providing the service for the user through a previously selected service medium, the operating method further comprising:

comparing an identifier of the selected service medium and an identifier of the previously selected service medium; and performing handover from the previously selected service medium to the selected service medium based on a result of the comparison, wherein the performing of the handover comprises:

reducing the predicted visual service effect of the selected service medium when the selected service medium is different from the previously selected service medium;

determining whether to perform handover to the selected service medium based on the reduced visual service effect of the selected service medium; and performing the handover if it is determined that the handover to the selected service medium has to be performed.

6. The electronic device of claim 5, wherein the processor is configured to predict the effectiveness based on a cumulative value of the visual service effect of the at least one service medium over time.

7. The electronic device of claim 5, wherein the processor is configured to update at least one parameter of the RL algorithm based on a reward from the IoT service environment, while providing the service for the user through the selected service medium.

8. The electronic device of claim 5, wherein the processor is configured to provide the service for the user through the previously selected service medium if it is determined that the handover to the selected service medium does not need to be performed.

* * * * *